Figure 1:
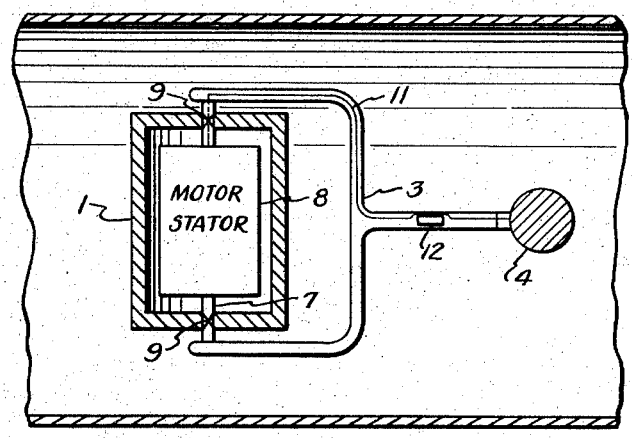

July 28, 1959

H. L. MASON 2,896,450

MASS FLOWMETER

Filed May 17, 1955

INVENTOR
Henry L. Mason

BY Arthur Vinograd
Leonard F. Stoll ATTORNEY
AGENT

United States Patent Office 2,896,450
Patented July 28, 1959

2,896,450

MASS FLOWMETER

Henry L. Mason, Washington, D.C., assignor to the United States of America as represented by the Secretary of Commerce Application May 17, 1955, Serial No. 509,126

7 Claims. (Cl. 73—194)

This invention relates to flowmeters and more particularly to a mass flowmeter utilizing the Magnus effect on a flexibly supported rotating cylinder.

Most flowmeters measure volumetric flow, but it is often desirable to measure the velocity with which fluid mass moves, or the mass-quantity crossing a given cross-sectional area per unit time, without a separate measurement of fluid density. The fluid may be a gas, liquid, granular material, or any combination of these.

At least three basic rotating-type mass flowmeters are known to the prior art. These might be classed as (1) the type using the principle of Coriolis' acceleration, (2) those employing a gyroscopic moment, and (3) those involving differential pressure on opposite sides of a rotor. Types (1) and (2) have the disadvantages of requiring bulky equipment and large diameter rotating sealed joints.

A flowmeter of type (3) employing the Magnus effect is described by D. Brand and L. A. Ginsel in Instruments, vol. 24, p. 331, published in March 1951. In this device a constant speed smooth-surfaced cylinder rotates about an axis transverse to the fluid flow, which flow is led around both sides of the rotating cylinder through gradually narrowing passages. The velocity of the fluid in one gap is increased and that in the other is decreased the same amount because of the film adhering to the cylinder. The difference in pressures at the two gaps is measured with a manometer. Such a device requires careful design of the flow channel and careful measurement of the manometric pressure differential. Further, attempts to use this device for air-liquid mixtures, have shown it to be unsatisfactory for such mixtures.

One object of this invention is to provide an improved mass flowmeter.

Another object of this invention is to provide a mass flowmeter which operates satisfactorily in measuring the flow of gas, liquids, granular material, or any combination thereof.

A further object of this invention is to provide a mass flowmeter which requires no rotating sealed joints.

A final object of this invention is to provide a mass flowmeter of simple, inexpensive construction requiring a minimum of bulky equipment.

The present invention utilizes the Magnus effect in conjunction with an elastically or flexibly supported rotating cylinder. The support is made of any conventional material which will undergo a measurable strain in response to any applied stress within the elastic limits of the material. It employs a constant-speed rotating cylinder having an axis, preferably vertical, transverse to the fluid stream. The axis sustains a transverse force that is the product of the mass density of the fluid, the fluid velocity, and the speed, cross-sectional area, and submerged length of the rotor. The displacement of this axis is measured and gives a result proportional to the mass flow of fluid.

Figure 2:
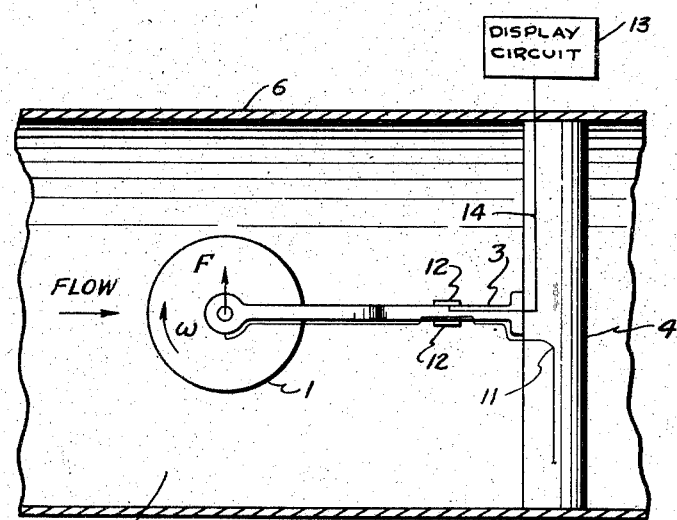
Figure 3:
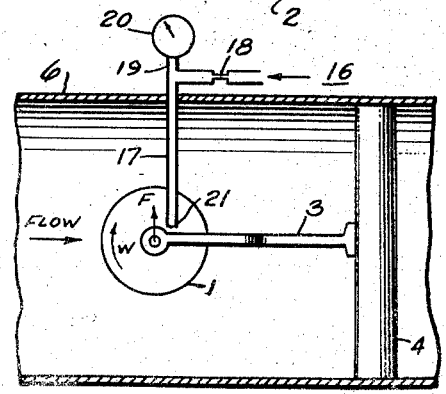

Other uses and advantages of the invention will become apparent upon reference to the specification and drawings in which:

Fig. 1 shows in schematic form an elevation view of the mass flowmeter of the present invention, Fig. 2 shows a schematic diagram of a top view of the mass flowmeter of Fig. 1, and Fig. 3 shows a modification of the invention exceptionally suited to air flow measurements.

It is well known in the field of fluid dynamics that a rotating cylinder immersed in a flowing medium produces a force perpendicular to the direction of flow. This is commonly referred to as the Magnus effect. If the cylinder rotates at constant speed, and is elastically supported by a material having a recognized stress-strain relationship within its elastic limits, such force produces a transverse displacement of the cylinder proportional to the mass flow of fluid. The magnitude of this force is represented by the equation $$F = 2\pi r^2 l \omega \rho U$$

where $F$ = transverse force
$r$ = radius of cylinder
$l$ = submerged length of the cylinder
$\omega$ = angular velocity of cylinder
$\rho$ = mass density of fluid
$U$ = undisturbed velocity of fluid.

If either the direction of flow or the direction of rotation is reversed, then the force is in a reversed direction.

Referring to the drawings, a rotating cylinder 1 is positioned in a channel 2 through which passes a fluid, in a direction from left to right as shown in Fig. 2. The rotating cylinder 1 is supported by a yoke 3 securely affixed to a cross bar or support 4 attached to the walls 6 of channel 2. Yoke 3 is made of any suitable material, for example, stainless steel, possessing the required amount of flexibility or elasticity in the direction of force F, and yet having sufficient strength and rigidity to support cylinder 1 in the two directions perpendicular to F. As is well known, materials such as stainless steel have a determinable stress-strain characteristic behaviour within the elastic limit of such material.

Yoke 3 carries a cross-bar 7 on which is supported the stator 8 of a synchronous motor of which cylinder 1 constitutes the rotor. The cylinder is supported to rotate freely on cross-bar 7 by means of bearings 9. Electrical connection is made to stator 7 by means of leads 11 through member 7, along yoke 3 to cross-bar 4 and thence to suitable external circuitry (not shown).

Two strain gages 12 mounted on yoke 3 are coupled to an external display circuit 13 through leads 14.

As cylinder 1 rotates at a constant angular velocity in a clockwise direction as shown in Fig. 2, with the flow direction as indicated, fluid will pile up on the side of the cylinder moving against the flow. Similarly a partial vacuum is created on the side of the cylinder moving in the same direction as the flowing fluid. The result is that a force is exerted on the cylinder through its axis in a direction normal to the flow of fluid and in the direction of the partial vacuum. The flexibility of yoke 3 allows the cylinder 1 to be displaced in proportion to the magnitude of the force exerted on the cylinder. The amount of deflection of flexible yoke 3 is detected by the two strain gages 12 mounted on the yoke. The outputs of strain gages 12 are led along yoke 3 to support 4 and out from channel 2 to suitable external display circuit 13.

In Fig. 3 is shown a modified embodiment of the mass flowmeter of the present invention in which yoke deflection is detected through the baffle action of the yoke against a nozzle bleeding fluid under pressure. The embodiment of Fig. 3 is particularly suited to the measurement of a flow of air.

In place of the strain gages 12 the modification of Fig. 3 includes an air supply indicated generally by an arrow at 16 feeding air under pressure through a channel 17 having a restriction at 18. Channel 17 includes a branch portion 19 terminated in a pressure-sensitive meter 20. A nozzle 21 at the end of channel 17 allows compressed air from the channel to escape at a rate determined by the proximity of yoke 3 to the nozzle. The rate of escape of air through nozzle 21 determines the pressure reading of meter 20 which may be calibrated in terms of the position of yoke 3 adjacent nozzle 21.

By suspending cylinder 1 so that its axis is vertical the effects of gravity and the effects of the buoyant force of the fluid on the cylinder deflection are eliminated. Likewise, a liquid flow which only partly fills channel 2 can be measured correctly, since the force produced is proportional to the submerged length of the rotor. Again, if the cross-section of channel 2 is unknown, the device will indicate the local density-velocity product, a quantity significant, for example, to the performance of jet aircraft. Also, as shown in the drawing, in the preferred embodiment, cylinder 1 is situated upstream of the support means so that the fluid impinging on the cylinder is undisturbed by the supporting structure.

It will be apparent that the embodiment shown is only exemplary and that various modifications can be made in construction and arrangement within the scope of the invention as defined in the appended claims.

What is claimed is:

1. A mass flowmeter comprising a fluid flow channel, a rigid member positioned across said channel, an elastic yoke connected to said rigid member, a cylinder rotatably supported about its longitudinal axis in said channel by said elastic yoke with said longitudinal axis of rotation of said cylinder disposed at an angle to the direction of flow, motor means within said cylinder for driving it at a substantially constant angular velocity, and means for measuring the amount of bend in said yoke caused by the force exerted on said cylinder normal to said flow.

2. A mass flowmeter as defined in claim 1 in which said measuring means includes a nozzle adjacent said yoke bleeding a fluid under pressure.

3. A mass flowmeter as defined in claim 1 in which said measuring means include strain gages attached to said yoke.

4. A mass flowmeter as defined in claim 3 in which said cylinder is positioned upstream in said flow channel with respect to said rigid member.

5. A mass flowmeter as defined in claim 4 in which the axis of said cylinder is in the vertical direction.

6. A mass flowmeter comprising a fluid flow channel, a rigid member positioned across said channel, a force-sensing arm capable of being elastically strained by a force connected to said member and rotatably supporting cylinder means in said channel with the axis of rotation of said cylinder means being at an angle to the direction of fluid flow, means for driving said cylinder means at a substantially constant velocity about said axis and means for measuring the magnitude of the strain in said arm caused by the force exerted on said cylinder normal to said flow.

7. A mass flowmeter for measuring fluid flow comprising: a rigid support, a force-sensing arm having one end rigidly secured to said support to form a cantilever beam capable of elastic flexure in response to an applied force, cylinder means rotatably secured to said force-sensing arm with the axis of rotation of said cylinder means being at an angle to the direction of flow of the fluid under measurement, driving means for rotating said cylinder means about said axis, and means mounted on said force-sensing arm for measuring the magnitude of the flexural strain in said arm caused by the force exerted on said cylinder normal to said fluid flow.

References Cited in the file of this patent
UNITED STATES PATENTS

| | | |
|---|---|---|
| 2,078,837 | Carter | Apr. 27, 1937 |
| 2,660,886 | Milmore | Dec. 1, 1953 |
| 2,683,369 | Brewer | July 13, 1954 |